United States Patent
Bengualid et al.

(10) Patent No.: US 10,452,126 B2
(45) Date of Patent: Oct. 22, 2019

(54) METHOD FOR FAIR OFF-LOADING OF COMPUTATIONAL TASKS FOR EFFICIENT ENERGY MANAGEMENT IN MOBILE DEVICES LIKE SMART PHONES

(71) Applicant: International Business Machines Corporation, Armonk, NY (US)

(72) Inventors: Mateo N. Bengualid, Cordova (AR); Marco P. Crasso, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 14/992,308

(22) Filed: Jan. 11, 2016

(65) Prior Publication Data

US 2017/0199559 A1 Jul. 13, 2017

(51) Int. Cl.
G06F 1/32 (2019.01)
G06F 1/329 (2019.01)
(Continued)

(52) U.S. Cl.
CPC ............ *G06F 1/329* (2013.01); *G06F 1/3212* (2013.01); *G06F 1/3228* (2013.01);
(Continued)

(58) Field of Classification Search
CPC ..... G06F 1/32; G06F 1/26; G06F 1/28; G06F 1/00
(Continued)

(56) References Cited

U.S. PATENT DOCUMENTS 7,127,437 B2   10/2006   Ratcliff, III
8,495,129 B2    7/2013   Wolman
(Continued)

FOREIGN PATENT DOCUMENTS

EP   2602715      12/2013
WO   2007121476   10/2007
WO   2012065273    5/2012

OTHER PUBLICATIONS

Fekete, K., Energy Efficient Code Optimization in Mobile Environment; IEEE Xplore Abstract; May 22, 2015; http://ieeexplore.ieee.org/xpl/login.jsp?tp=&arnumber=6972195&url=http%3A%2F%2Fieeexplore.ieee.org%2Fxpls%2Fabs_all.jsp%3Farnumber%3D6972195.

(Continued)

*Primary Examiner* — Jaweed A Abbaszadeh
*Assistant Examiner* — Keshab R Pandey
(74) *Attorney, Agent, or Firm* — George R. McGuire; Bond Schoeneck & King, PLLC; Aaron Pontikos

(57) ABSTRACT

A system and process for off-loading computational tasks of mobile devices participating in a network that selects a leader from a set of mobile devices interconnected in a network and allows the leader to receive a broadcast of data about the computational power and battery level of each device in the network. Proposed tasks for off-loading are then fairly distributed among the participating devices by maximizing the minimal well-being of the participating devices, such as by considering the battery level for the i-est mobile device after t seconds have passed, the original battery level for the i-est mobile device, and the battery level discharge for the i-est mobile device, processing n tasks in t seconds. The tasks are completed by the assigned mobile device and the results reported to the mobile device that proposed the task.

8 Claims, 7 Drawing Sheets

(51) Int. Cl.
  *H04W 52/02*    (2009.01)
  *G06F 9/50*     (2006.01)
  *G06F 1/3212*   (2019.01)
  *G06F 1/3228*   (2019.01)
  *H04L 29/08*    (2006.01)

(52) U.S. Cl.
  CPC .......... *G06F 9/5083* (2013.01); *G06F 9/5094* (2013.01); *H04L 67/2861* (2013.01); *H04W 52/0219* (2013.01); *H04W 52/0251* (2013.01); *Y02D 70/144* (2018.01)

(58) Field of Classification Search
  USPC ....... 713/300, 310, 320, 321, 322, 323, 324, 713/330, 345, 375
  See application file for complete search history.

(56) References Cited

U.S. PATENT DOCUMENTS

| | | | |
|---|---|---|---|
| 8,510,577 | B2 | 8/2013 | Scott |
| 2014/0095695 | A1 | 4/2014 | Wang |
| 2014/0141744 | A1 | 5/2014 | Miluzzo |
| 2014/0189389 | A1* | 7/2014 | Lynar .................. G06F 1/329 713/320 |
| 2015/0042484 | A1* | 2/2015 | Bansal ................ G06F 1/3212 340/693.3 |
| 2015/0099505 | A1* | 4/2015 | Kiukkonen ......... H04M 1/7253 455/419 |
| 2016/0157221 | A1* | 6/2016 | Kim .................... H04L 67/322 455/450 |

OTHER PUBLICATIONS

Li, Z., Wang, C., Xu, R., Computation Offloading to Save Energy on Handheld Devices: a Partition Scheme; May 22, 2015; http://dl.acm.org/citation.cfm?id=502257.

Bar, A., Nesto—Network Selection and Traffic Offloading System for Android Mobile Devices; IEEE Xplore Abstract; May 22, 2015; http://ieeexplore.ieee.org/xpl/login.jsp?tp=&arnumber=6583582&url=http%3A%2F%2Fieeexplore.ieee.org%2Fiel7%2F6578011%2F6583517%2F06583582.pdf%3Farnumber%3D6583582.

Kumar, K., Liu, J., Lu, Y., Bhargava, B., A Survey of Computation Offloading for Mobile Systems; Mobile Networks and Applications, vol. 18, Issue 1, pp. 129-140; http://link.springer.com/article/10.1007%2Fs11036-012-0368-0.

Dinh, H., Lee, C., Niyato, D., Wang, P., A Survey of Mobile Cloud Computing: Architecture, Applications and Approaches; May 22, 2015; http://onlinelibrary.wiley.com/doi/10.1002/wcm.1203/full.

Segata, M., Towards Energy Efficient Smart Phone Applications: Energy Models for Offloading Tasks Into the Cloud; IEEE Xplore Abstract; May 22, 2015; http://ieeexplore.ieee.org/xpl/articleDetails.jsp?tp=&arnumber=6883681.

Korach, E., Kutten, S., Moran, S., A Modular Technique for the Design of Efficient Distributed Leader Finding Algorithms; ACM Transations on Programming Languages and Systems; vol. 12, No. 1; Jan. 1990; pp. 84-101.

\* cited by examiner

METHOD FOR FAIR OFF-LOADING OF COMPUTATIONAL TASKS FOR EFFICIENT ENERGY MANAGEMENT IN MOBILE DEVICES LIKE SMART PHONES

BACKGROUND

The present invention is directed to methods and systems for off-loading computational tasks among mobile devices in a network to conserve on energy usage that maximize the minimal well-being of all mobile devices participating in the network.

Users rely on smart phones for performing an increasing number of computing tasks. Different factors, including the ubiquity of Internet connections, have transformed mobile devices, such as smart phones, from being a supplementary computing device to being the main one for some users. One of the main factors that slow down the aforementioned transformation is the limited battery life of smart phones. Lithium-ion batteries, for example, provide limited computational power, which decreases each time a computing task is performed. Therefore, a main problem in the field is how to allow users to perform more computing tasks without running out of battery.

Some approaches to solving this problem use an off-loading technique to maximize battery life. Off-loading involves moving computational tasks from a mobile device to another computer, e.g. other mobile devices, a desktop computer, or server. To date, off-loading is performed on a relatively ad hoc basis and does not employ a global strategy for ordering and prioritizing computational tasks among the participants in a network. Accordingly, there is a need in the art for an off-loading process that provides for an orderly, prioritized off-loading of computational task across a network of the mobile device that are participating in the off-loading process in order to fairly maximize battery life across all devices.

SUMMARY

The present invention is a system and process for off-loading computational tasks of mobile devices participating in a network. The process comprises the step of selecting a leader from a set of mobile devices interconnected in a network. Next, each mobile device broadcasts data about the device for use by the designated leader in determining how computational tasks will be fairly off-loaded from a given mobile device to other devices in the network. The broadcasted data includes a set of metrics, which may include initial metrics for a new device participating in the network or current metrics for a previously participating device, with the metrics updated regularly or continuously. The broadcasted data also includes the battery capacity of the mobile device to the leader. Next, each mobile device broadcasts any task to be off-loaded along with the data and operations needed to perform the tasks. The designated leader than aggregates current battery levels, the throughput and consumption metrics of the participating device, and the tasks to be performed and generates a solution which maximizes the minimal well-being of the participating devices by considering the battery level for the i-est mobile device after t seconds have passed, the original battery level for the i-est mobile device, and the battery level discharge for the i-est mobile device, processing n tasks in t seconds. Once the tasks have been assigned to maximize minimum well-being, the tasks are completed by the mobile devices to which the tasks were assigned with the results reported back to the mobile device that proposed the task. Participating mobile device then update their information, such as their computational and battery status, to reflect any changes the resulted from performing assigned tasks and participating in the off-loading.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
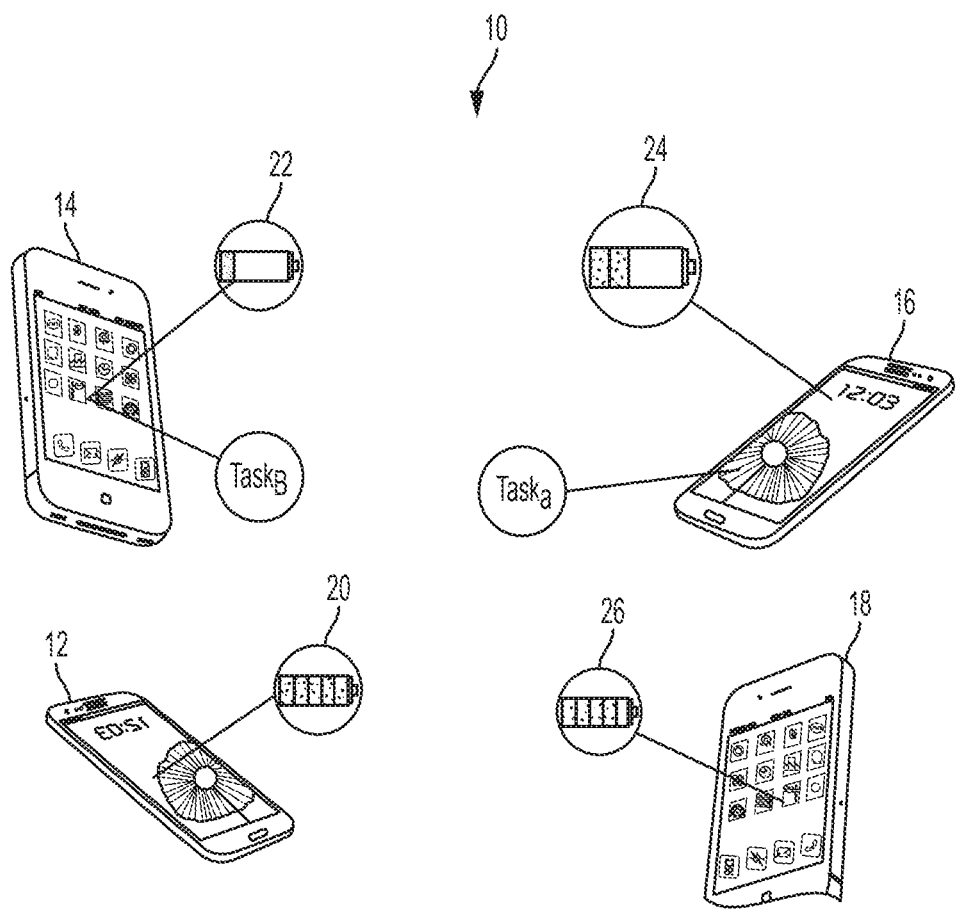
FIG. 1 is a schematic of a network of mobile devices engaged in off-loading of tasks according to the present invention.

Referring now to the drawings, wherein like reference numerals refer to like parts throughout, there is seen in FIG. 1 a network 10 in which any number of mobile devices 12, 14, 16 and 18 are participating, such as by being interconnected through the same LAN, paired using Bluetooth, or any other existing or future technology for exchanging data. Each mobile device 12, 14, 16 and 18 has a battery capacity 20, 22, 24, and 26, respectively, and certain of the mobile devices, such as mobile device 14 and mobile device 16, may have certain computational tasks to be off-loaded and performed by other devices, shown as $Task_B$ and $Task_A$, respectively, to conserve battery life. The present invention addresses the problem that if the mobile devices proposing these tasks were to execute the tasks, the necessary processing would downgrade battery life to zero, thereby presenting an undesirable situation. For example, the user of the device could be preventing from making or receiving an emergency call.

Figure 2:
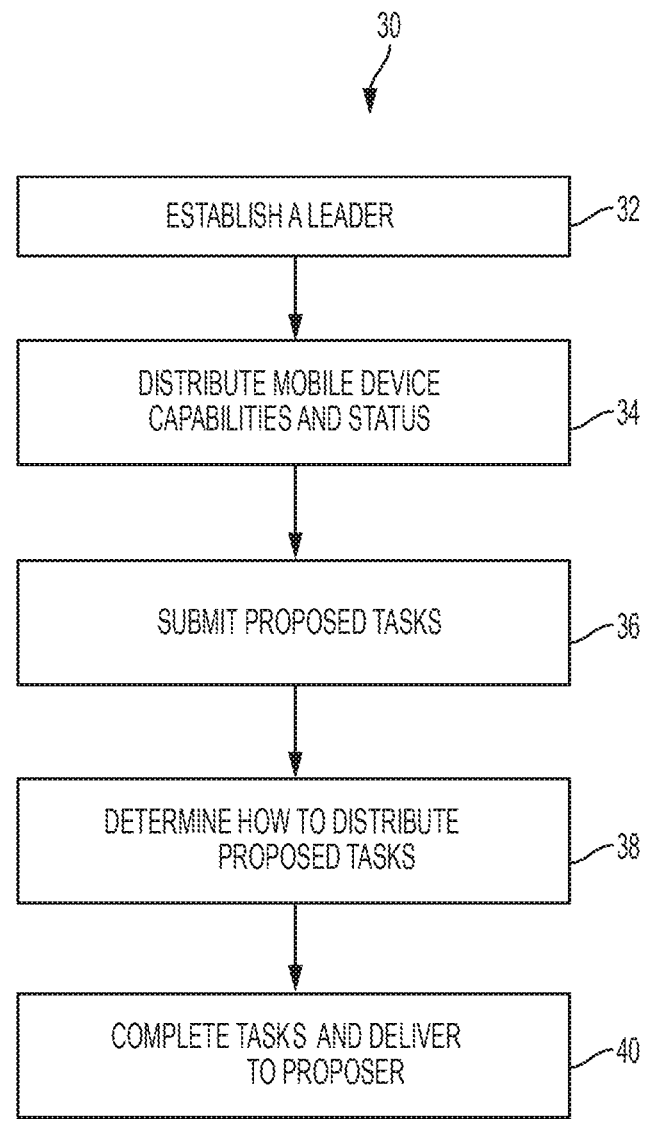
FIG. 2 is a flowchart of a process for off-loading tasks according to the present invention.
Figure 3:
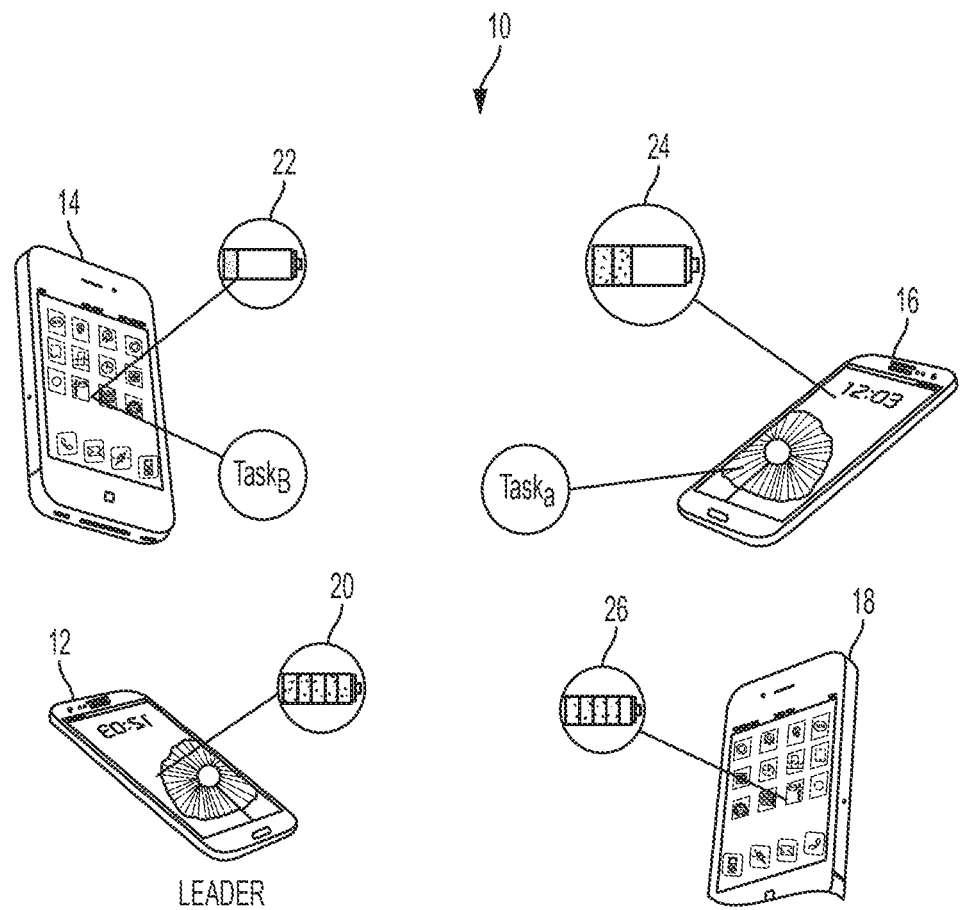
FIG. 3 is a schematic of a network of mobile devices engaged in off-loading of tasks according to the present invention.

Referring to FIG. 2, network 10 implements a process 30 for fair off-loading of computational tasks of any mobile devices participating in network 10. Process 30 may be implemented via software, such as an application, that is pre-installed on all devices participating in the network or that is sent to participating devices joining the network. The first step in process 30 involves establishing a mobile device that will act as the leader 32. The establishment of a leader in a mobile device network for the purposes of process 10 can be accomplished using conventional approaches, such as a known efficient leader finding algorithm for a distributed, asynchronous network. Alternatively, the leader could be selected randomly or according to a predetermined criteria or metric, such as computational power or batter level. FIG. 3 illustrates the selection of mobile device 12 as the leader.

Figure 4:
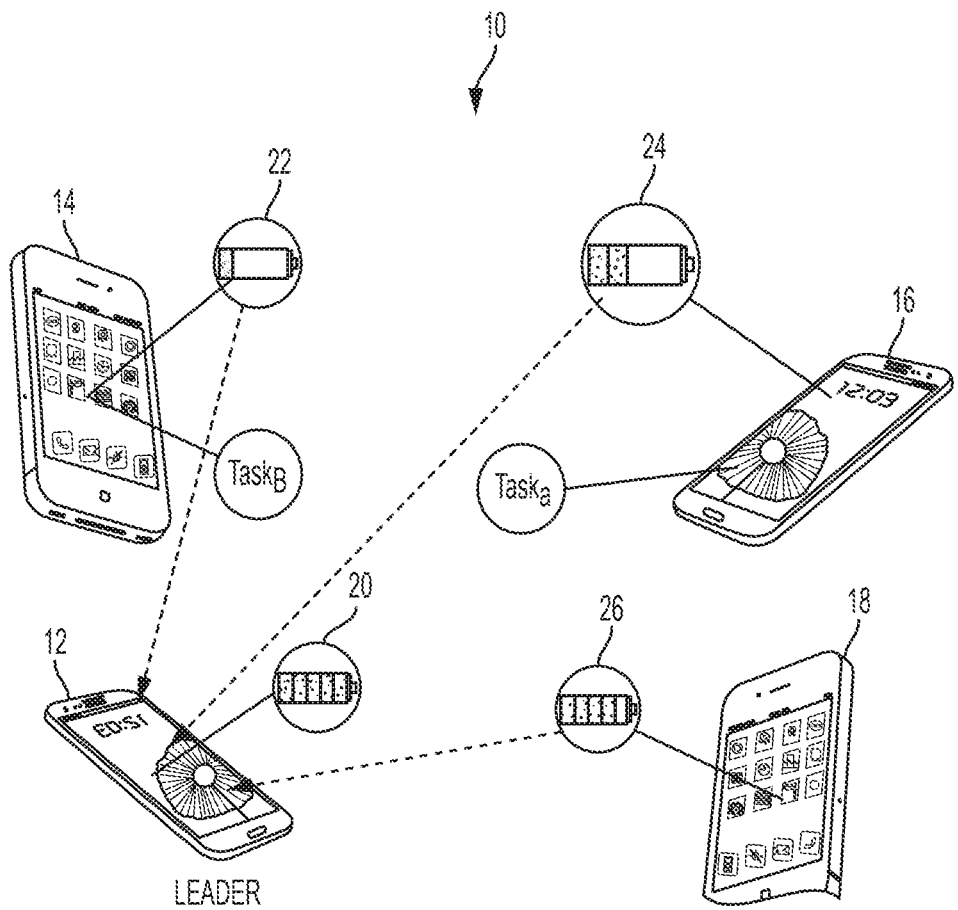
FIG. 4 is a schematic of a network of mobile devices engaged in off-loading of tasks according to the present invention

Next, the capabilities and status of mobile devices in network 10 must be distributed 34, such as by each device broadcasting to network 10. If a mobile device is connecting to the network for the first time or has no metrics describing its capabilities, the mobile device must accept a number of tasks, either spurious or not, to perform an initial estimation of the throughput of the mobile device, measured in number of tasks over seconds, and the power consumption of the device, measured in number of tasks battery capacity. These initial metrics are then broadcast, along with the battery capacity of the mobile device, to network 10. If a device connecting to the network has already broadcast its initial metrics to the network, the mobile device must broadcast its current metrics and battery capacity, and regularly or continuously update its metrics and battery capacity, either automatically or in response to a request. As seen in FIG. 4, each mobile device may have a different current battery capacity reported to network 10.

Figure 5:
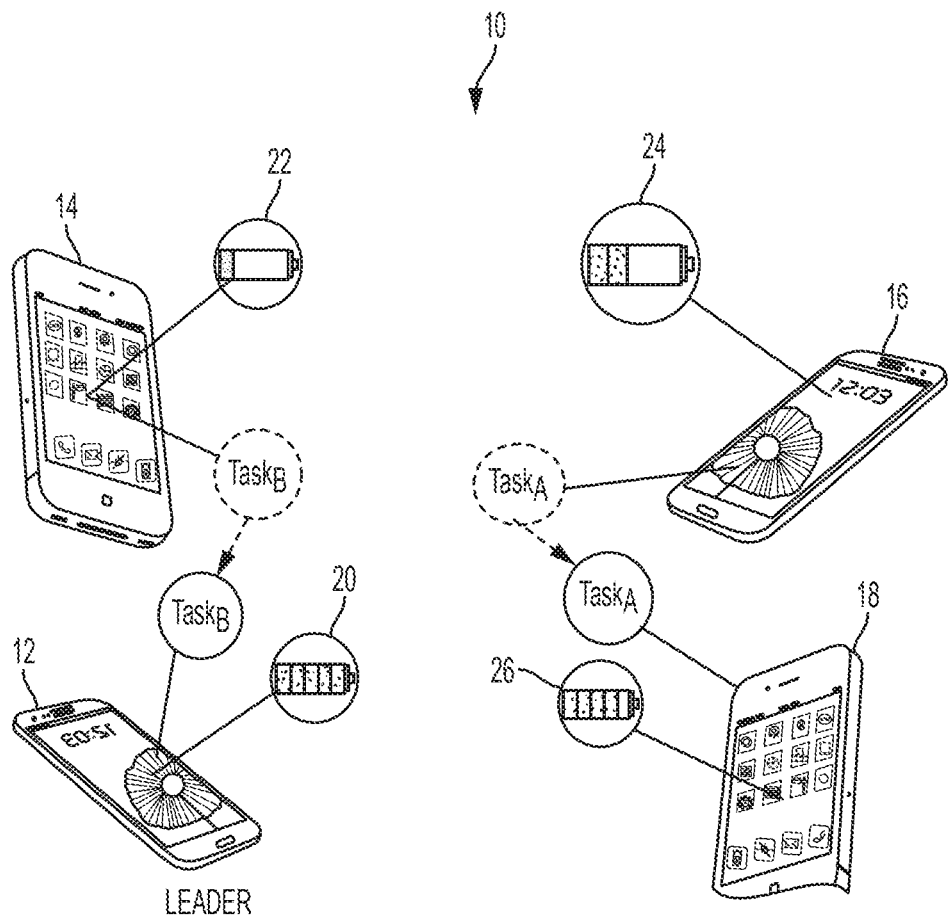
FIG. 5 is a schematic of a network of mobile devices engaged in off-loading of tasks according to the present invention.

After the mobile device capabilities and status have been distributed 34, each mobile device must submit its proposed tasks 36, if any, to network 10. In this step, each mobile device with a task acts as a proposer that sends a proposal of one or more proposed tasks to network 10. The proposal includes the number of tasks, the operations associated with the tasks, and the data associated with the tasks. As seen in FIG. 5, mobile device 16 is the proposer of $Task_B$ and mobile device 18 is the proposer of $Task_A$.

Once tasks have been proposed to network 10, the designated leader, shown as mobile device 12 in the figures, determines how to fairly distribute the tasks 38. For example, the leader can aggregate the current battery levels, throughput and consumption metrics, along with current number of tasks for all mobile devices seeking to off-load tasks. Once the aggregation is complete, the leader determines how to fairly off-load the proposed tasks 38. For example, the leader may solve the following maximin equation given the functions and constants by distributing tasks among devices:

$$\max \cdot \min \cdot E_{(t)}^{-i} = e_0^i - G_{(n,t)}^i \forall t$$

with $E_{(t)}^i$ representing the battery level for the i-est mobile device after t seconds have passed, $e_0^i$ representing the original battery level for the i-est mobile device, and $G_{(n,t)}^i$ represents the battery level discharge for the i-est mobile device, processing "n" tasks in "t" seconds (assuming each task takes the same amount of time to finish as any other, for the same device). The leader may solve the relaxed continuous differential equations stated above and assign tasks based on the discrete solution. Alternatively, the leader may designate a bucket for each mobile device, from now on the executor and, while maintaining the maximin rule constraint, discretely assign tasks to get the highest throughput. As seen in FIG. 5, $Task_B$ was assigned to mobile device 12 and $Task_A$ was assigned to mobile device 18.

Figure 6:
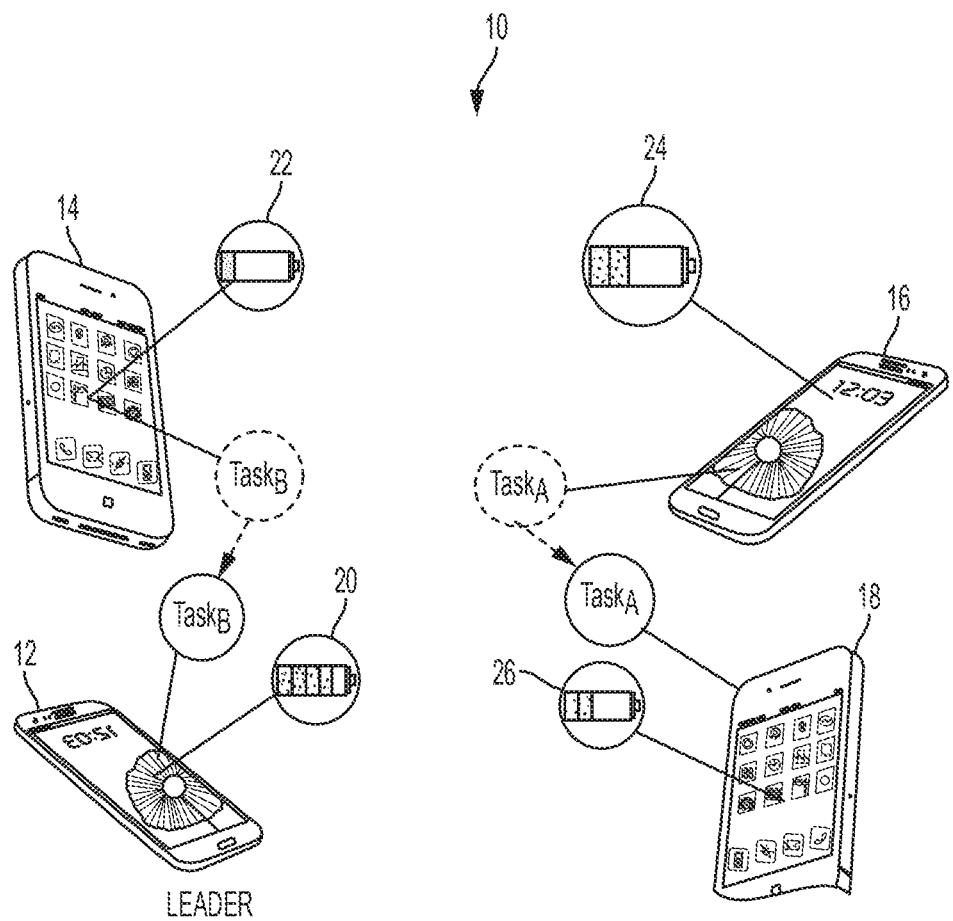
FIG. 6 is a schematic of a network of mobile devices engaged in off-loading of tasks according to the present invention.
Figure 7:
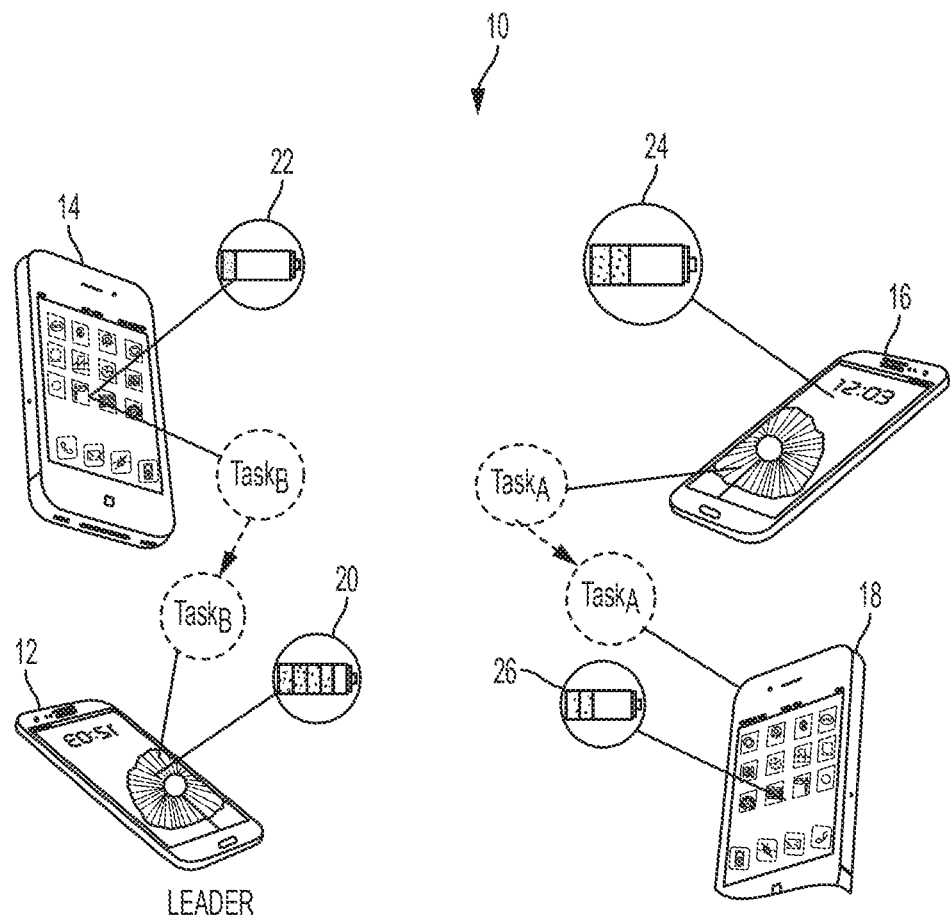
FIG. 7 is a schematic of a network of mobile devices engaged in off-loading of tasks according to the present invention.

Finally, the tasks are completed by the designated mobile device 40, as selected according to step 38, with the completed task delivered to the proposer of each task. For example, the leader may notify the proposer which device is the target executor to which the task, operations and data must be sent. The leader may then waits for the chosen executor to report. If a certain number of seconds has elapsed and the mobile device selected as the executor has not reported, the leader may assume that the device has left the network and select a new mobile device as the executing device for the task according to step 38. If the executor successfully executes the tasks, the output results are sent to the original proposer and a report is sent to the leader indicating that the task has been performed along with an update of metrics as the battery status of the executor has presumably changed. As seen in FIGS. 6 and 7, $Task_B$ is performed by mobile device 14 and reported back to mobile device 16 (the proposer of $Task_B$), and $Task_A$ is performed by mobile device 20 and reported back to mobile device 18 (the proposer of $Task_A$).

The present invention thus proposes a set of processes for fair off-loading of computation tasks from a group of mobile devices, a system for implementing these processes and a product that allows its use on mobile devices. As mobile devices are highly heterogeneous in their capabilities, i.e., similar computing power, memory, battery power and network throughput, the present invention is designed to promote the principle that, assuming justice is fairness, the best (most just) outcome is the one that maximizes the minimum well-being of its constituents. By analogy, the present invention aims at maximizing the minimum well-being for all the mobile devices on the group. Unlike conventional approaches, the present invention provides a radically different environment where mobile devices present their tasks to the group and solve them by themselves using fairness principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of off-loading tasks in a network, comprising the steps of:
    assigning a first mobile computing device participating in the network to be a leader;
    broadcasting to the leader information representing the computational metrics and battery status of each other mobile computing device participating in the network;
    broadcasting to the leader at least one computational task to be off-loaded by at least one other mobile computing device participating in the network;
    aggregating the computational metrics and battery status of each other mobile computing device participating in the network;
    determining how to distribute the at least one computational task to be off-loaded in a manner that maximizes the battery life of all mobile computing devices participating in the network by considering a battery level for each other mobile device after t seconds have passed, an original battery level for the each other mobile device, and a battery level discharge for each other mobile device, processing n tasks in t seconds;
    assigning the at least one computational task to be off-loaded to another mobile computing device participating in the network according to the manner that maximizes the battery life of all mobile computing devices participating in the network;
    completing the at least one computational task to be off-loaded with the another mobile computing device and providing the results of the completed computational task back to the at least one other mobile computing device that broadcasted the at least one task to be off-loaded; and
    updating the information representing the computational metrics and battery status of each other mobile computing device participating in the network;
    wherein the step of determining how to distribute the at least one task to be off-loaded in a manner that maximizes the battery life of all mobile devices participating in the network comprises solving the maximin equation:

$$\max \cdot \min \cdot E_{(t)}^{-i} = e_0^i - G_{(n,t)}^i, \forall i, t$$

where $e_0^i$ representing an original battery level for each other mobile device, $E_{(t)}^i$ represents a battery level for each other mobile device after t seconds have passed from when the original battery level for each other mobile device was measured, and $G_{(n,t)}^i$ represents a battery level discharge for each other mobile device, processing n tasks in t second;

wherein the step of assigning the at least one task to be off-loaded according to the manner that maximizes the battery life of all mobile devices participating in the network comprises assigning tasks based on a discrete solution to the maximin equation.

2. The method of claim 1, wherein the step of assigning the at least one task to be off-loaded according to the manner that maximizes the battery life of all mobile devices participating in the network comprises designating a bucket for each mobile device participating in the network and discretely assigning tasks to get the highest throughput while maintaining the maximin equation constraint.

3. The method of claim 1, wherein the computational metrics comprise the throughput of the mobile device measured in number of tasks over seconds.

4. The method of claim 3, wherein the computational metrics comprise the power consumption of the device measured in number of tasks.

5. A system for off-loading tasks in a network, comprising:
- a first mobile device participating in the network designated as a leader;
- at least a second mobile device programmed to broadcast to the leader information representing its computational metrics and battery status, to broadcast to the leader at least one task to be off-loaded, and to update its computational metrics and battery status; and
- wherein the leader is programmed to aggregate the computational metrics and battery status of each other mobile device participating in the network, to determine how to distribute the at least one task to be off-loaded in a manner that maximizes the battery life of all mobile devices participating in the network based on a battery level for each other mobile device after t seconds have passed, an original battery level for the each other mobile device, and a battery level discharge for each other mobile device, processing n tasks in t seconds, and to assign the at least one task to be off-loaded according to the manner that maximizes the battery life of all mobile devices participating in the network;
- wherein the leader is programmed to determine how to distribute the at least one task to be off-loaded in a manner that maximizes the battery life of all mobile devices participating in the network by solving the maximin equation:

$$\max \cdot \min \cdot E_{(t)}^{-i} = e_0^i - G_{(n,t)}^i, \forall i, t$$

where $e_0^i$ representing an original battery level for each other mobile device, $E_{(t)}^i$ represents a battery level for each other mobile device after t seconds have passed from when the original battery level for each other mobile device was measured, and $G(n, t)^i$ represents a battery level discharge for each other mobile device, processing n tasks in t second;

wherein the leader is programmed to assign the at least one task to be off-loaded according to the manner that maximizes the battery life of all mobile devices participating in the network by assigning tasks based on a discrete solution to the maximin equation.

6. The system of claim 5, wherein the leader is programmed to assign the at least one task to be off-loaded according to the manner that maximizes the battery life of all mobile devices participating in the network by designating a bucket for each mobile device participating in the network and discretely assigning tasks to get the highest throughput while maintaining the maximin equation constraint.

7. The system of claim 5, wherein the computational metrics comprise the throughput of the mobile device measured in number of tasks over seconds.

8. The system of claim 7, wherein the computational metrics comprise the power consumption of the device measured in number of tasks.

* * * * *